United States Patent [19]

Casebolt

[11] Patent Number: 4,977,647
[45] Date of Patent: Dec. 18, 1990

[54] DOUBLE LOCKING SNAP HOOK

[75] Inventor: Scott C. Casebolt, North St. Paul, Minn.

[73] Assignee: D.B. Industries, Inc., Red Wing, Minn.

[21] Appl. No.: 427,716

[22] Filed: Oct. 27, 1989

[51] Int. Cl.$^5$ ............................................. A44B 13/02
[52] U.S. Cl. .............................. 24/599.5; 24/241 SB
[58] Field of Search ....... 24/241 PP, 241 SB, 241 SL, 24/241 PS, 230.5 AD, 232

[56] References Cited

U.S. PATENT DOCUMENTS

| | | | |
|---|---|---|---|
| 939,727 | 11/1909 | Maki | 24/241 PP |
| 1,289,096 | 12/1918 | Boatright | 24/241 SL |
| 1,626,866 | 5/1927 | Neilson | 24/241 SB |
| 1,711,346 | 4/1929 | Greve | 24/241 P |
| 1,879,168 | 9/1932 | Freysinger | 24/241 SB |
| 1,949,608 | 3/1934 | Johnson | 24/241.5 B |
| 2,490,931 | 12/1949 | Thompson | 24/241 PS |
| 3,918,758 | 11/1975 | Fournier | 24/241 SB |
| 4,062,092 | 12/1977 | Tamada et al. | 24/241 SB |
| 4,320,561 | 3/1982 | Muller et al. | 24/241 PS |
| 4,333,212 | 6/1982 | Bibollet | 24/233 |
| 4,372,016 | 2/1983 | La Violette et al. | 24/241 PS |
| 4,379,579 | 4/1983 | Mahan et al. | 294/83 R |
| 4,401,333 | 8/1983 | Merry | 294/83 R |
| 4,434,536 | 3/1984 | Schmidt et al. | 24/241 PP |
| 4,440,432 | 4/1984 | Goris | 294/82 R |
| 4,528,728 | 7/1986 | Schmidt et al. | 24/241 P |
| 4,528,729 | 7/1985 | Schmidt et al. | 24/241 P |
| 4,539,732 | 9/1985 | Wolner | 24/241 SB |
| 4,546,523 | 10/1985 | Bailey, Jr. | 24/241 PP |
| 4,554,712 | 11/1985 | Le Beon | 24/241 PP |
| 4,621,851 | 11/1986 | Bailey, Jr. | 294/82.2 |
| 4,645,255 | 2/1987 | Zepf | 294/82.19 |
| 4,731,910 | 3/1988 | Purcell et al. | 24/239 |
| 4,767,144 | 8/1988 | Hornberg | 294/82.36 |

FOREIGN PATENT DOCUMENTS 798247 7/1958 United Kingdom .

*Primary Examiner*—Victor N. Sakran
*Attorney, Agent, or Firm*—Moore & Hansen

[57] ABSTRACT

A double locking snap hook comprising a shank, a spring biased latch member and a spring biased locking means, the latch member and locking means being biased by two separate screens. One end of the shank defines a hook portion, and the latch member is biased toward a latched position for restraining straps, ropes, etc. within the hook portion. The locking means is biased toward a position which requires that the locking means be deactivated before the latch member may be unlatched or opened.

17 Claims, 2 Drawing Sheets

DOUBLE LOCKING SNAP HOOK

BACKGROUND OF THE INVENTION

1. Technical Field

The invention relates to the field of double locking snap hook designs and provides an anchoring device for retaining safety harnesses, load supports, lanyards and the like.

2. Background Information

The double locking snap hook generally consists of a hook portion and an eye to which a rope may be secured. The hook portion includes a latch which is spring loaded, biasing the latch into a closed, latched position. Further, a locking means, also spring loaded, is provided to help prevent the latch from inadvertently becoming opened, thus maximizing the safety factor of the hook. In recent years, several new designs for double locking snap hooks have been introduced. The safety and effectiveness of any snap hook of this variety is directly related to the ease of use and simplicity of operation of the snap hook. Unfortunately, many of these designs are either clumsy to use or too easily unlocked and unlatched. Similarly, some of these designs are not adequately durable, and components of the locking mechanism sometimes break or wear off, rendering the snap hook useless.

Among the more relevant prior art patents are U.S. Pat. Nos. 4,434,536 issued to Schmidt et al. on Mar. 6, 1984, 4,528,728 issued to Schmidt et al. on July 16, 1985, 4,528,729 issued to Schmidt et al. on July 16, 1985, and 4,539,732 issued to Wolner on Sept. 10, 1985. In their commercial embodiments, the locking snap hooks made according to the '536 reference and relevant embodiments of the '728 reference are difficult to use because the locking member is difficult to access, especially by a worker wearing gloves. The safety snap of the '732 reference, while effective and simple to use, is relatively complicated in design, and requires the use of several parts, increasing the likelihood of the hook becoming broken or otherwise disabled due to dirty conditions or heavy wear.

The present invention is directed to solving these problems and provides a workable and economical solution to them.

SUMMARY OF THE INVENTION

As noted in the '732 reference, a double lock snap hook device allows a belt connection, such as a fall protection device, window washer's harness, or the like, to be retained within the double lock snap system. The double lock snap system includes a shank which has a return portion at one end which defines a hook, and a nose spaced from the shank which defines a hook throat. An eyelet is located at the other end of the shank which provides a means for attaching a load support member, such as a lanyard or the like. The double lock snap system further includes a latch member having one end pivotally mounted on the shank and the other end engageable with the hook nose to close the hook throat. The latch member is displaceable between a closed position, wherein the belt connection is retained within the hook by the latch member engaging the hook nose, and an open position, wherein the belt connection may be removed from within the hook throat. A latch member spring aids the latch member in moving between its open and closed positions, biasing the latch member toward the closed, latched position.

An object of the invention is to provide a double lock snap hook which will securely hold that to which it has been attached. When in use, the double locking snap hook latch member is retained in its closed position by a lock member. The lock member also pivots between a first position and a second position, maintaining the latch member in its closed position when the lock member is located in its first position. The lock member also includes a spring which biases the lock member toward the first position.

The lock member is controlled by the user, who displaces the lock member by means of the finger pad found thereon. The finger pad of the lock member is easily distinguised from the latch member by the user because of a finger positioning member protruding from the shank between the lock member and the latch member. An object of the invention is thus to provide a double lock snap hook which is easily operable by the user. A further object of the finger positioning member of the invention is to preclude a semi rigid rod from inadvertently simultaneously opening both the lock member and the latch member.

Other objects and advantages of the invention will become apparent from the following detailed description and from the appended drawings in which like numbers have been used to describe like parts of the several views.

DESCRIPTION OF THE PREFERRED EMBODIMENT

Figure 1:
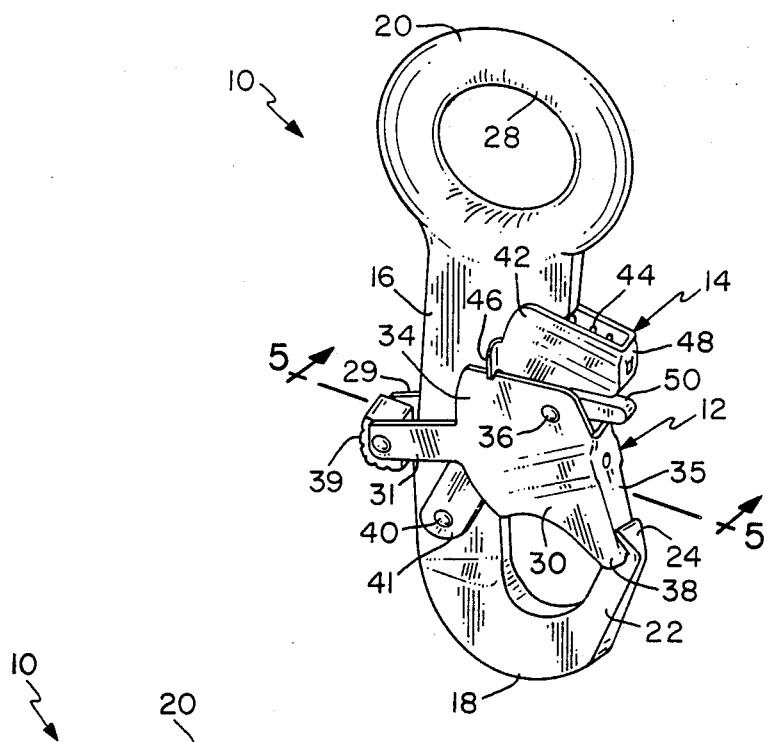
FIG. 1 is a perspective view of the instant invention illustrating the latch member in its first, latched position and the lock member in its first position.

With reference to the drawings, and in particular to FIG. 1, the double locking snap hook of the present invention is generally indicated by reference numeral 10. The spring biased latch member 12 and spring biased lock member 14 are both pivotally attached to shank 16.

Figure 3:
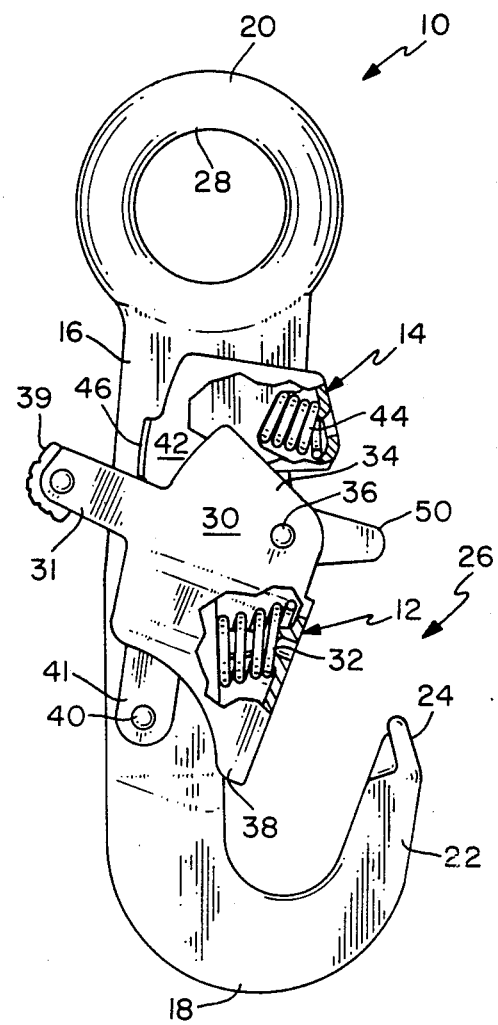
FIG. 3 is a side elevation view of the instant invention, partially in section, illustrating the lock member in its second position and the latch member in its second, open position.

The shank 16 has a first end 18 and a second end 20. The first end 18 includes a return portion 22 defining a hook, the return portion 22 including a nose 24 spaced from the shank 16 to define a hook throat 26 (FIG. 3). The second end 20 of shank 16 includes a means, such as an eyelet or O-ring 28, for attaining a load support member such as a safety harness, lanyard or the like.

Figure 2:
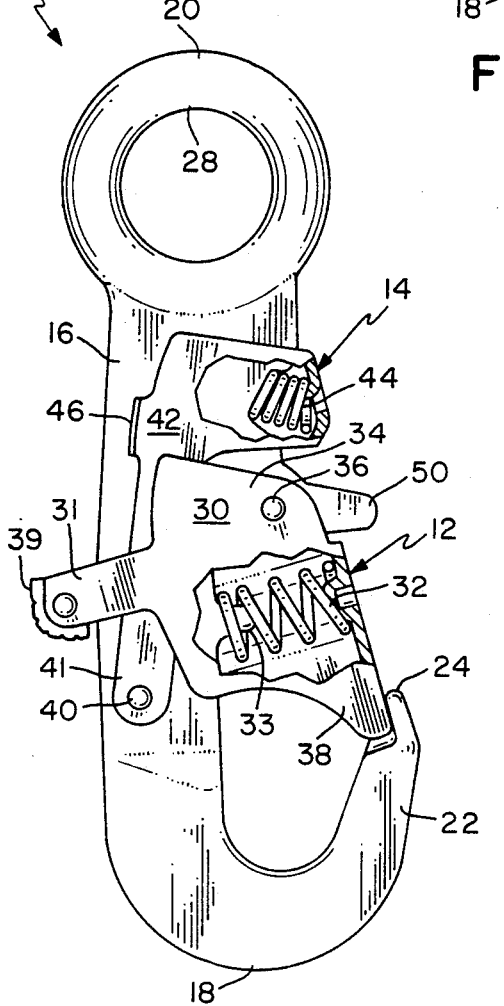
FIG. 2 is a side elevation view of the instant invention, partially in section, illustrating the lock member in its second position.
Figure 4:
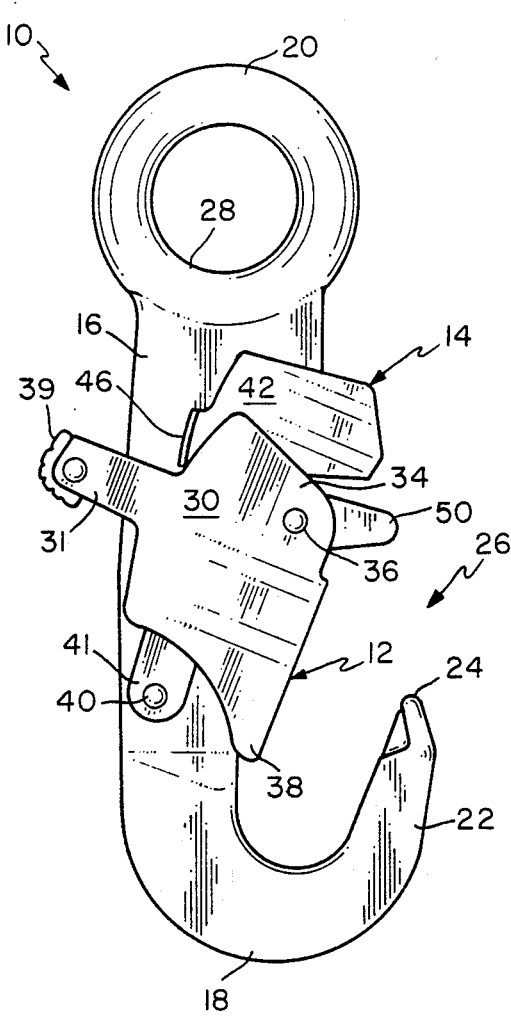
FIG. 4 is a side elevation view illustrating the lock member in an intermediate position, having been released by the user, with the latch member in its second, open position.
Figure 5:
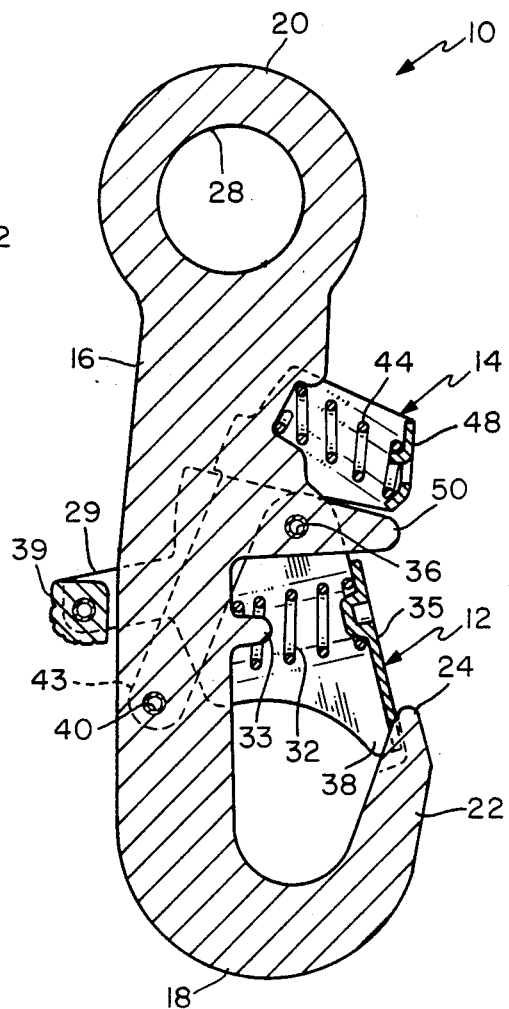
FIG. 5 is a sectional view taken along line 5—5 of FIG. 1.

The spring biased latch member 12 includes a bifurcated latch body 30 with opposed side walls which straddle hook shank 16. A biasing spring means such as first spring 32 is contained within latch body 30 for urging latch member 12 into a first, latched position, shown if FIGS. 1 and 2. As shown in FIG. 5, shank 16 is provided with a spring retaining means such as a peg 33 for helping maintain spring 32 in the correct relative position. Latch member 12 further includes a first end 34, pivotally mounted on shank 16 by pivot means such as latch member pin 36, and a second end 38 engageable with hook nose 24 to close hook throat 26. The latch member 12 is movable between the first, latched position, as indicated in FIGS. 1, 2 and 5, and a second, open position, as indicated in FIGS. 3 and 4. When latch member 12 is in its first, latched position, end surface 35 spans hook throat 26, thus closing off the hook defined by shank return portion 22. A thumb actuation means 39, preferably in the form of a knurled pad, is mounted to or otherwise integral with rearwardly extending arms 29 and 31 of latch member 12. Thumb activation means 39 is mounted on the rear side of shank 16 so as to have the shank 16 intermediate thumb activation means 39 and the first and second ends 34, 38, respectively, of latch member 12.

The spring biased locking means 14 is also a bifurcated member comprised of a lock body 42 and legs, 41, 43 extending downwardly and rearwardly therefrom when snap hook 10 is oriented as shown in the accompanying drawings, in straddling relation to hook shank 16. Locking member 14 is pivotally attached to shank 16 by pivot means such as pin 40 extending through the lower end of legs 41, 43. Locking member 14 is attached adjacent hook throat 26 of return portion or hook 22 opposite nose 24, as best illustrated in FIGS. 3 and 5. Legs 41, 43 and lock body 42 of locking means 14 are at least partially received within latch member 12, with legs 41, 43 passing through and extending beyond latch member 12. Locking means 14 releasably locks latch member 12 into its first, latched position, as most clearly indicated in FIG. 1. Locking means 14 includes a spring means such as second spring 44 positioned within lock body 42 for urging locking member 14 into the locking position of FIG. 1 when latch member 12 is located in its first, latched position. Lock member 14 is activated by the user by pressing finger pad 48 in a direction opposing second spring 44, thus displacing the lock member 14 to the position shown in FIG. 2. In the preferred embodiment, spring 44 is retained within locking means 14 between shank 16 and finger pad 48 as illustrated in FIG. 5. In its preferred embodiment, lock body 42 includes two locking ear projections 46, one of which is located on each side of snap hook 10. Ear projections 46 extend laterally outwardly from lock body 42 on opposite sides of shank 16 and engage the top edges of first, upper end 34 of latch member 12 to maintain it in its first, latched position.

As oriented in the accompanying drawings, shank 16 includes a forwardly protruding finger positioning segment or nub 50 projecting therefrom in the plane of the shank 16. Finger positioning segment 50 is positioned adjacent the first end 34 of latch member 12 under lock member 14, opposing nose 24 of return portion 22. The front surface 35 of latch member 12 terminates below the upper edges of its first end 34 in order to provide an opening through which segment 50 extends.

In use, the double locking snap hook 10 may be grasped in the palm of the user's hand with thumb activations means 39 positioned near the user's thumb. In order to either remove an item already fastened to the snap hook or fasten an item to the snap hook, the user must first displace lock member 14. This may be accomplished by pressing against finger pad surface 48, thus compressing second spring 44, as shown in FIG. 2. The finger pad surface may be easily located by the user by first finding the protruding finger positioning piece 50, which acts as a guide or reference point. The user may then move his or her finger to the appropriate position on the finger pad 48 without fear of inadvertently getting his or her finger caught in the latch member 12. After displacing lock member 14, the user displaces latch member 12 by forcing thumb activation means 39 to the position shown in FIG. 3, compressing first spring 32. Lock member 14 may then be released by removing the finger from the finger pad 48, leaving the various components of snap hook 10 as shown in FIG. 4. The item to be removed from or attached to the snap hook 10 may then be passed through hook throat 26, and thumb activation means 39 may be released.

While the preferred embodiments of the invention have been described, it should be understood that various changes, adaptations, and modifications may be made therein without departing from the spirit of the invention and the scope of the appended claims.

What is claimed is:

1. A double locking snap hook, comprising:
   a shank having a first end and a second end, said shank having a return portion at said first end to define a hook, said return portion including a nose spaced from the shank to define a hook throat;
   a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position; and
   spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position.

2. The double locking snap hook as described in claim 1, wherein:
   said lock body further includes at least one locking ear projection, said ear projection engaging said latch member and maintaining said latch member in said first, latched position when said locking means is in said locking position.

3. The double locking snap hook as described in claim 1, wherein:
   said spring biased locking means is pivotally attached to said shank adjacent said hook throat of said hook.

4. The double locking snap hook as described in claim 3, wherein:
   said locking means is pivotally attached to said shank first end at a location thereon generally opposite said return portion nose.

5. The double locking snap hook as described in claim 1, further comprising:
   means on said second end of said shank for attaching a load support member.

6. The double locking snap hook as described in claim 1, wherein:
said latch member includes a means for thumb actuation thereon, said means for thumb actuation being mounted to said latch member on the opposite side of said shank from said return portion of said shank with said shank intermediate said means for thumb actuation and said first and second ends of said latch body.

7. The double locking snap hook as described in claim 6, wherein:
said lock body includes a finger pad thereon on the opposite side of said shank from said means for thumb actuation of said latch member.

8. The double locking snap hook as described in claim 1, wherein:
said latch member pivots about a first pivot means and said locking means pivots about a second pivot means, said second pivot means being located between said first end of said shank and said first pivot means.

9. The double locking snap hook as described in claim 8, wherein:
said second pivot means is located between said first end of said shank and said latch member.

10. A double locking snap hook, comprising:
a shank having a first end and a second end, said shank having a return portion at said first end to define a hook, said return portion including a nose spaced from the shank to define a hook throat;
a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;
spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position; and
said shank further includes a protruding finger positioning member projecting therefrom in the plane of said shank and positioned adjacent said first end of said latch member, opposing said nose of said hook, as a locating means for said lock body.

11. A double locking snap hook, comprising:
a shank having a first end and a second end, said shank having a return portion at said first end to define a hook, said return portion including a nose spaced from the shank to define a hook throat;
a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;
spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position;
said latch member includes a means for thumb actuation thereon, said means for thumb actuation being mounted to said latch member on the opposite side of said shank from said return portion of said shank with said shank intermediate said means for thumb actuation and said first and second ends of said latch body;
said lock body includes a finger pad thereon on the opposite side of said shank from said means for thumb actuation of said latch member; and
a protruding positioning member projecting from said shank in close proximity to said finger pad for locating said finger pad with the user's finger.

12. The double locking snap hook as described in claim 11, wherein:
said protruding positioning member is located between said finger pad and nose of said return portion.

13. A double locking snap hook, comprising:
a shank having a first end and a second end, said shank having a return portion at said first end to define a hook, said return portion including a nose spaced from the shank to define a hook throat;
a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;
spring biased locking means pivotally attached to said shank for releasably locking said latch member into said first, latched position, said spring biased locking means including a lock body and said spring means for urging said locking means into a locking position in restraining engagement with said latch member when said latch member is located in said first, latched position; and
a protruding finger positioning member projecting from said shank in the plane of said shank and positioned adjacent said first end of said latch member, opposing said nose of said hook, as a locating means for said lock body.

14. The double locking snap hook as described in claim 13, wherein:
said spring biased locking means passes through said latch member.

15. The double locking snap hook as described in claim 14, wherein:

said spring biased locking means includes a second spring means within said lock body.

16. A double locking snap hook, comprising:
- a shank having a first end and a second end, said shank having a return portion at said first end to define a hook, said return portion including a nose spaced from the shank to define a hook throat;
- a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;
- spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position; and
- said latch member pivots about a first pivot means and said locking means pivots about a second pivot means, said second pivot means being located between said first end of said shank and said first pivot means.

17. A double locking snap hook, comprising:
- a shank having a first end and a second end, said shank having a return portion at said first end to define a hook, said return portion including a nose spaced from the shank to define a hook throat;
- a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;
- spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position; and
- said latch member pivots about a first pivot means and said locking means pivots about a second pivot means, said second pivot means being located between said first end of said shank and said latch member.

* * * * *